(12) United States Patent
Tatourian

(10) Patent No.: US 11,204,750 B2
(45) Date of Patent: Dec. 21, 2021

(54) SYSTEMS, METHODS AND APPARATUS FOR DISTRIBUTED SOFTWARE/FIRMWARE UPDATE AND SOFTWARE VERSIONING SYSTEM FOR AUTOMATED VEHICLES

(71) Applicant: Intel Corporation, Santa Clara, CA (US)

(72) Inventor: Igor Tatourian, Fountain Hills, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/941,959

(22) Filed: Mar. 30, 2018

(65) Prior Publication Data

US 2019/0050217 A1    Feb. 14, 2019

(51) Int. Cl.
| | | |
|---|---|---|
| *G06F 8/65* | (2018.01) | |
| *H04W 4/46* | (2018.01) | |
| *H04L 29/08* | (2006.01) | |
| *B60W 50/00* | (2006.01) | |
| *H04W 12/10* | (2021.01) | |
| *H04W 4/44* | (2018.01) | |

(Continued)

(52) U.S. Cl.
CPC ............... *G06F 8/65* (2013.01); *B60W 50/00* (2013.01); *H04L 67/12* (2013.01); *H04L 67/34* (2013.01); *H04W 4/44* (2018.02); *H04W 4/46* (2018.02); *H04W 12/10* (2013.01); *G06F 8/654* (2018.02); *H04W 4/50* (2018.02)

(58) Field of Classification Search
CPC .......... G06F 8/65; G06F 21/00; B60W 50/00; H04L 67/12; H04L 67/34; H04W 4/46
See application file for complete search history.

(56) References Cited

U.S. PATENT DOCUMENTS

| | | | |
|---|---|---|---|
| 10,019,255 B1 * | 7/2018 | Greenfield | G06F 8/65 |
| 2004/0031030 A1 * | 2/2004 | Kidder | G06F 1/14 |
| | | | 717/172 |

(Continued)

*Primary Examiner* — Daxin Wu
(74) *Attorney, Agent, or Firm* — Spectrum IP Law Group LLC

(57) ABSTRACT

The disclosed embodiments generally relate to methods, systems and apparatuses for dynamic firmware/software (FW/SW) update distribution in highly and fully autonomous or automated vehicles. In one embodiment, the disclosure relates to an apparatus to dynamically upgrade code in a vehicle. The apparatus may include: a communication module for one or more of wireless or landline communication; a central processing unit (CPU) in communication with the communication module, the CPU configured to receive an indication requiring a code upgrade to an existing vehicle code software and receive the code upgrade; store the code upgrade; execute code upgrade in parallel with the existing vehicle code software; log one or more error indications resulted from execution of the code upgrade; replace the existing vehicle code with the code upgrade if the logged error indication is less than a first threshold; and direct the code upgrade to a second vehicle to update the second vehicle code. The disclosed embodiments may be implemented in autonomous driving (AD) vehicles as well as vehicles having operating code or software/firmware.

28 Claims, 11 Drawing Sheets

(51) Int. Cl.
*G06F 8/654* (2018.01)
*H04W 4/50* (2018.01)

(56) References Cited

U.S. PATENT DOCUMENTS

| | | | | |
|---|---|---|---|---|
| 2004/0162964 | A1* | 8/2004 | Ota | G06F 9/30174 |
| | | | | 712/200 |
| 2007/0261049 | A1* | 11/2007 | Bankston | G06F 8/65 |
| | | | | 717/170 |
| 2011/0138377 | A1* | 6/2011 | Allen | G01D 4/004 |
| | | | | 717/173 |
| 2015/0143354 | A1* | 5/2015 | Mathew | G06F 8/656 |
| | | | | 717/170 |
| 2016/0291959 | A1* | 10/2016 | Searle | H04L 63/10 |
| 2016/0299718 | A1* | 10/2016 | Bhattacharjee | G06F 3/0637 |
| 2017/0123784 | A1* | 5/2017 | Zymeri | H04L 41/082 |
| 2018/0103121 | A1* | 4/2018 | Yun | H04L 67/34 |
| 2018/0341476 | A1* | 11/2018 | Kitao | H04L 67/34 |
| 2019/0108010 | A1* | 4/2019 | Tillman | G07C 5/0841 |

* cited by examiner

SYSTEMS, METHODS AND APPARATUS FOR DISTRIBUTED SOFTWARE/FIRMWARE UPDATE AND SOFTWARE VERSIONING SYSTEM FOR AUTOMATED VEHICLES

FIELD

The present disclosure generally relates to autonomous driving vehicles. Specifically, an embodiment of the disclosure relates to dynamic firmware/software (FW/SW) update distribution in highly and fully autonomous or automated vehicles.

BACKGROUND

Autonomous Driving (AD) vehicles bring a new ecosystem with new requirements on the cloud and the network architecture. By 2020, one AD vehicle will use about 4,000 GB of data per day (vs. 1.5 GB for an average internet user per day). The increased demand creates a data tsunami. Modern vehicles have about 100 million lines of code. In fully autonomous (e.g., SAE Level 5) vehicles, the lines of codes are expected to reach over 500 million lines. Conventional methods for managing the software upgrade and its deployment are inadequate for the current FW/SW update much less the large number of expected autonomous vehicles.

Conventional solutions focus on delivering Over-the-Air ("OTA") updates. The conventional system endeavor to prevent SW rollback to previous vulnerable versions. Microsoft™, Google™ and Apple™ created systems where there is only one possible version of the software (i.e., the latest version). However, their update mechanisms are not appropriate for a vehicle as they require system downtime and reboot during which the platform may get corrupted and fail to recover. The conventional update systems also fail to support forward- and backward-compatibility. By way of example, Windows™ software cannot run on an old hardware. The conventional software update methods do not straddle updates to ensure that updates do not cause disruption if something goes wrong. The update itself is often successful until at runtime where the system experiences or discovers new bugs.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
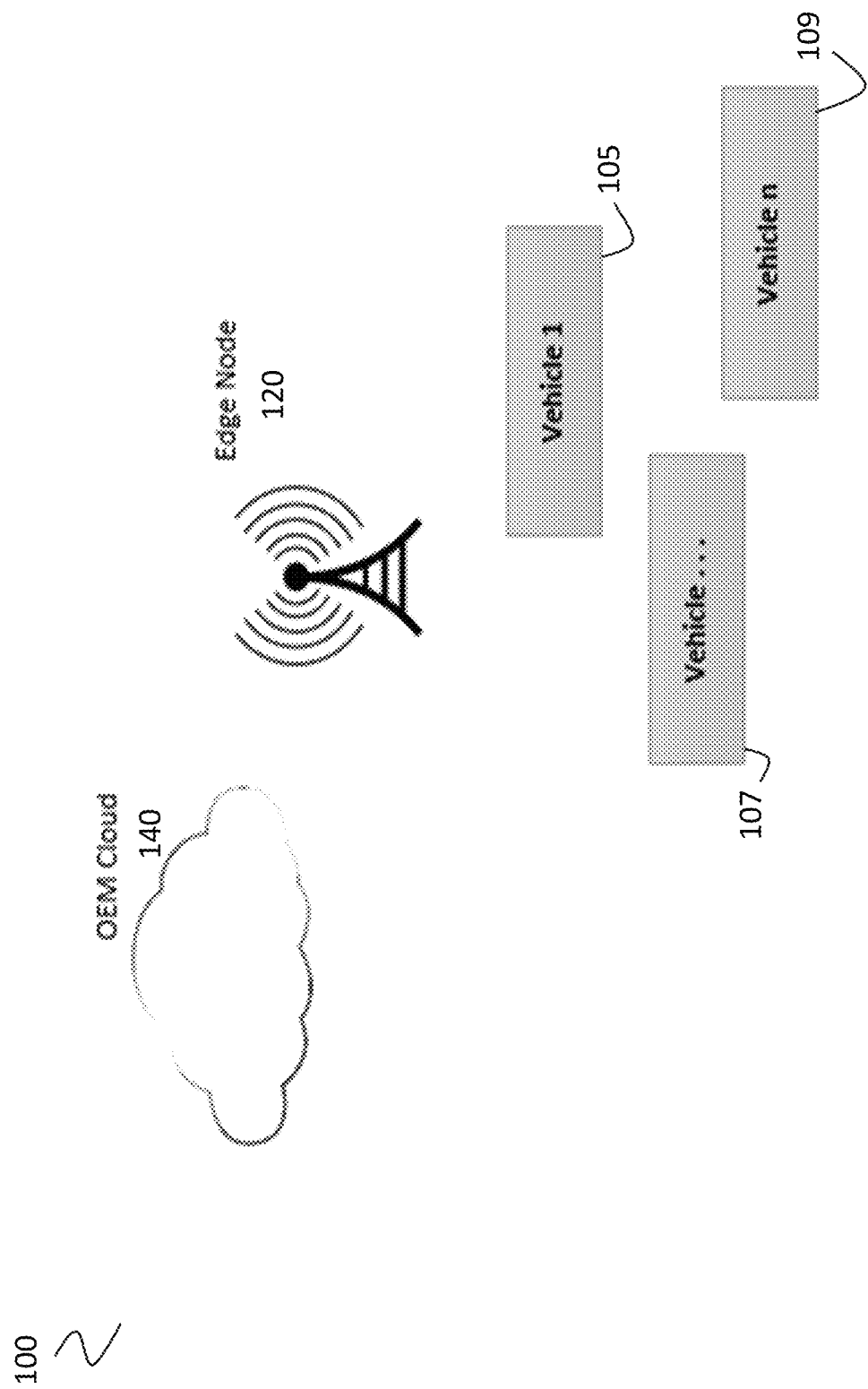
FIG. 1 schematically illustrates an exemplary environment according to one embodiment of the disclosure.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As stated, modern vehicles have around 100 million lines of code and in fully autonomous vehicles it is expected to reach beyond 500 million lines. Conventional methods of updating the software (and/or firmware) are inefficient in meeting such demands and pose multiple problems. First, number of software security vulnerabilities grows exponentially with software age. This is the so-called Honeymoon Effect where number of vulnerabilities is small in the new software but grows once security researchers, hackers, and cybercriminals obtain access it the code. This is even after the release of security patches.

Second, consumers demand new features once they become available and popular. Average age of a car is over 10 years which is an eternity for software. The newly released software typically introduces new bugs and vulnerabilities. It will be important to have a system in place where human error will not decrease safety, security, and reliability of the vehicle.

Third, manufacturers install software fixes when software bugs are discovered. Many of the fixes are for safety-critical systems on which reliability and safety of the vehicle and its occupants depend. Presently, such systems can only be updated by a mechanic in a car shop. Even Tesla™ does not have a system to update some of the safety-critical Engine Control Units ("ECUs"). However, manufacturers are looking for the mechanisms to reliably update all FW/SW, including safety-critical, in a vehicle over-the-air (OTA) without causing interruption or inconvenience for vehicle owners.

Even for fully autonomous (i.e., Level 5) vehicles there are only two open windows for applying OTA update delivery: when an electrical car is charging (e.g., Tesla models) or when the vehicle is operating. The vehicle may not be updated off the battery because such process drains the batter quickly. To address these challenges, an infrastructure for maintaining software versioning is required.

In certain embodiments, the disclosure proposes an architecture that allows safe, secure, and reliable OTA FW/SW update for vehicles. By way of example, an exemplary update according to one embodiment of the disclosure may include one or more of the following steps: straddling updates, removing software versioning in the vehicles (i.e., prior or incompatible versions), allowing background updates, supporting forward- and backward-compatibility, protecting Supplier's FW if necessary by encrypting it, delivering updates in a hybrid mode using vehicle-to-vehicle communication channels including future 5G. In certain embodiments, the straddling between the updates and the prior version may be recursively.

In one embodiment, straddling includes sampling updates to a small number of devices and waiting for a period of time before increasing number of affected devices (vehicles) if everything is confirmed to work correctly. In one embodiment, straddling updates may be implemented in small geographical samples (or areas) to include or consider environmental parameters that could affect the proper working of updates. Straddling may also use hybrid channels such as one car caching and pushing updates to adjacent cars which it may interact with via vehicle-to-vehicle ("V2V") channel(s).

Current update mechanisms are still very fragile and not acceptable for updating vehicles OTA except non-critical ECUs such as In-Vehicle-Infotainment ("IVI"). For example, a common experience is forced computer or smartphone update that crashes the device and requires manual effort to reset or reinstall the base software. Another common experience is updates that break application compatibility and cause loss of functionality including inaccessibility to to network or other hardware resources.

As the new SW/FW (e.g., a new version or an update) becomes available, it cannot be pushed to all vehicles simultaneously due to risks that the update may pose to safety-critical systems. While it is expected that the update was sufficiently tested, it is common that the update may introduce new bugs and/or vulnerabilities. With the artificial intelligence ("AI") implemented in autonomous vehicles, edge cases may will be overlooked during testing which can manifest as problems in real-life.

In an exemplary embodiment, the disclosure selects a small sample of vehicles (e.g., a subset) in several geographical areas and will push the updates to the selected cars behind the feature flags (or feature toggles). This means that the new FW/SW code (e.g., updates) will be running in parallel to the old code in read-only mode for a while without actuating anything or impacting safety-critical flows. Any error may be logged and reported for review and fix. A central orchestrator, which may be implemented in hardware, software or firmware, may observe and measure performance and efficiency of the old and the new code. If after a period the orchestrator determines that the new code works without bugs, it may allow the new code to actuate while disabling the same capability from the old code but still executing it and using it as a boundary for the new code. After another statistically meaningful sampling, the old code may be removed from the system by the orchestrator. At this stage, the vehicle may report success in testing the new code to the cloud. From here, the vehicle may push the new code to other vehicles it encounters via direct 5G, LTE or WiFi channel. The cloud may additionally start broadcasting updates to wider number of vehicles. In certain embodiments, supplier-specific SW may be protected by encrypting and securing access to the supplier's encryption keys. There are several unique advantages in the disclosed embodiments including, secure key management for suppliers in order to protect their code and data, straddled SW update behind feature flags, lateral SW distribution using V2V technologies to reduce bandwidth requirements on cellular links, and removal of SW versions by maintaining all vehicles at the latest SW version. It should be noted that certain older vehicles may be unable to run all new features due to HW limitations. In some embodiments, this limitation may be determined by the vehicle's SW orchestrator.

FIG. 1 schematically illustrates an exemplary environment according to one embodiment of the disclosure. Environment 100 includes vehicles 105, 107 and 109 (captioned as Vehicles 1 . . . n). Each vehicle 105, 107 and 109 may comprise an autonomous driving (AD) vehicle or an automated vehicle having one or more ECUs. Operation of each of vehicles 105, 107 and 109 may require significant calculations and consumes extensive compute bandwidth. Each vehicle may further include significant codes governing operations of various aspect of each vehicle. The AI and other function of vehicles 105, 107 and 109 may require code update in the form of FW/SW updates. Environment 100 of FIG. 1 also includes Edge Node 120. Edge node 102 may comprise one or more Multi-Access Edge Computing ("MEC") nodes at the edge of the network. Environment 100 also includes OEM cloud 140. Cloud 140 may comprise one or more distributed data centers (not shown). In the embodiment of FIG. 1, vehicles 105, 107 and 109 are presumed to be within communication reach of Edge node 120.

Figure 2:
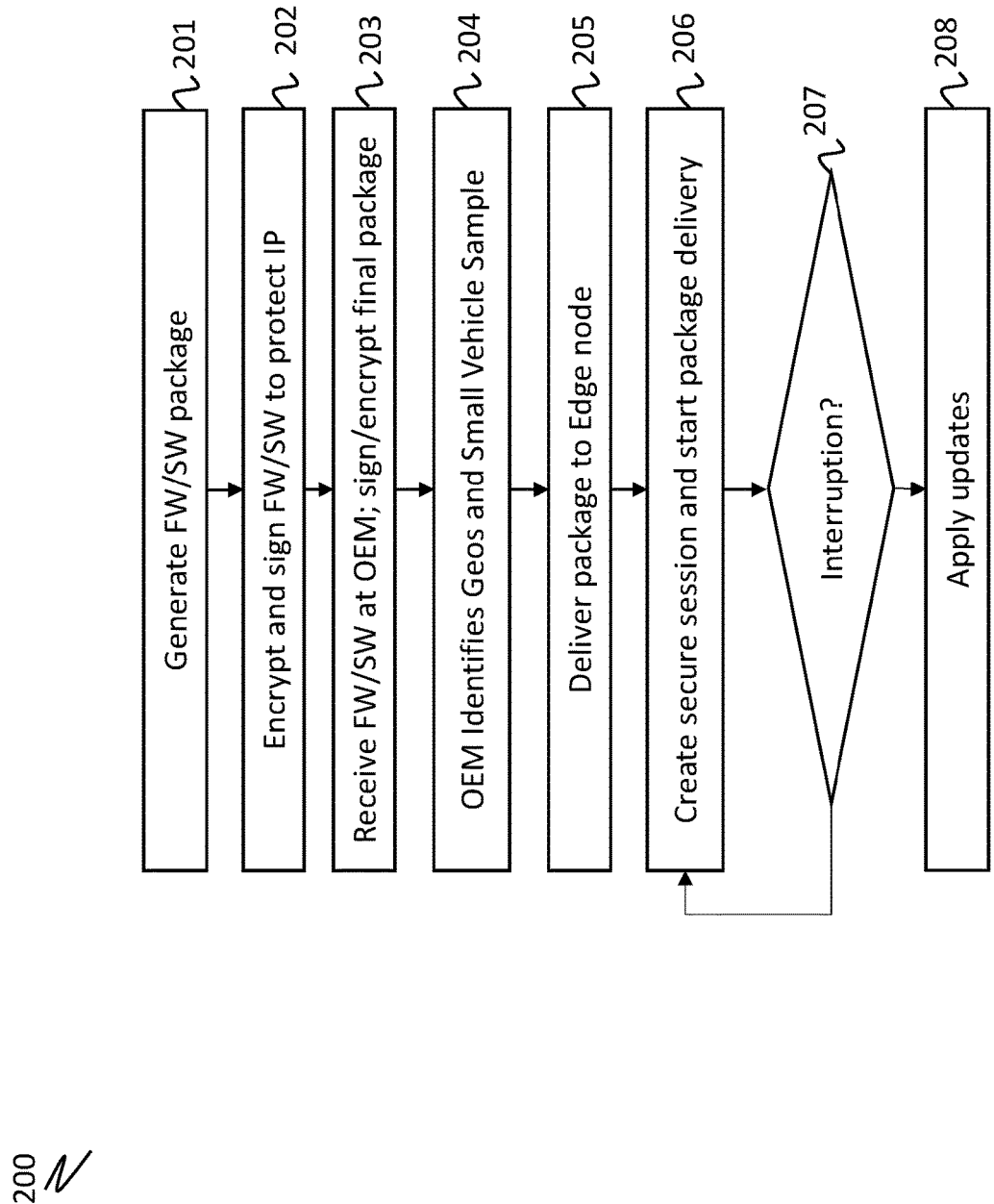
FIG. 2 is a flow diagram showing an exemplary implementation of an embodiment of the disclosure.

FIG. 2 is a flow diagram showing an exemplary implementation of an embodiment of the disclosure. Process 200 of FIG. 2 starts at step 201 when a supplier or an OEM generates FW/SW package. Either a supplier or the OEM may generate FW/SW updates or patches. An exemplary application may be to generate FW delta; that is, to include only the bits that have been changed in order to reduce transmission bandwidth requirements. At step 202, the suppliers may encrypt and sign its own FW/SW for protection. Encryption may be implemented according to conventional or proprietary method to evade hacking.

If the supplier is providing the FW/SW updates, then the OEM receives the updates from the supplier at step 203. The OEM may optionally sign and encrypt the final package before transmission.

In certain embodiments, the OEM may select a subset, or a sample of vehicles destined to receive the update(s). This is shown at step 204. The sample may be selected based on different criteria. For example, in one embodiment, the sample may be selected geographically. Such selection may target vehicles that are likely to represent desired (or undesired) environmental factors that provide the most-likely representatives of the larger sample.

At step 205, the package is delivered to the Edge node (e.g., 120, FIG. 1) for caching (optional) and distribution to the vehicles. The package may be routed directly from the Edge node to the vehicle or may be cached at the Edge node for future delivery to the vehicle.

At step 206, once the target vehicle(s) is/are within the coverage area (e.g., driving or parked at a garage) of the Edge node, a secure session may be created between the vehicle and the Edge node to deliver the update(s) to a special connectivity gateway of the vehicle. The special connectivity gateway may comprise hardware, software and logic configure to validate authenticity of the received information and decrypt the package. Package delivery may be done by establishing a secure connection between the transmitter (i.e., Edge node) and the vehicle. In one embodiment, the vehicle is in operation when such connectivity is made. In another embodiment, the vehicle is parked but connected to a power source while the connectivity is made.

A connectivity gateway (GW) may be configured within the vehicle to validate authenticity of the received information and decrypt the received package.

At step 207, an interruption test is made. This step may be implemented periodically or upon detecting an interruption to package delivery. If update is interrupted due to communication problems, the vehicle that receives the update will note the position (bookmark) of the final packet. The next time the vehicle is back in the communication range, it will resume receiving updates from the bookmarked position. In certain embodiments, forward error correction may be used during transmission to account for missing data packets.

At step 208, FW/SW updates are received at the vehicle's connectivity GW and are applied internally. Applying updates may optionally have one of two forms. In a full update option, once the update has been successfully received and verified, the connectivity GW will retrieve older FW/SW from its internal storage and apply the changed bits. At this point the connectivity GW may sign the package and transmit it to the intended ECU within the vehicle. In a differential encrypted update option, the gateway passes the encrypted blob directly to the ECU which retrieves encrypted FW/SW from the storage (e.g., flash memory) and without decrypting only modifies the changed bits and writes the blob back to the storage media using random access.

Figure 3:
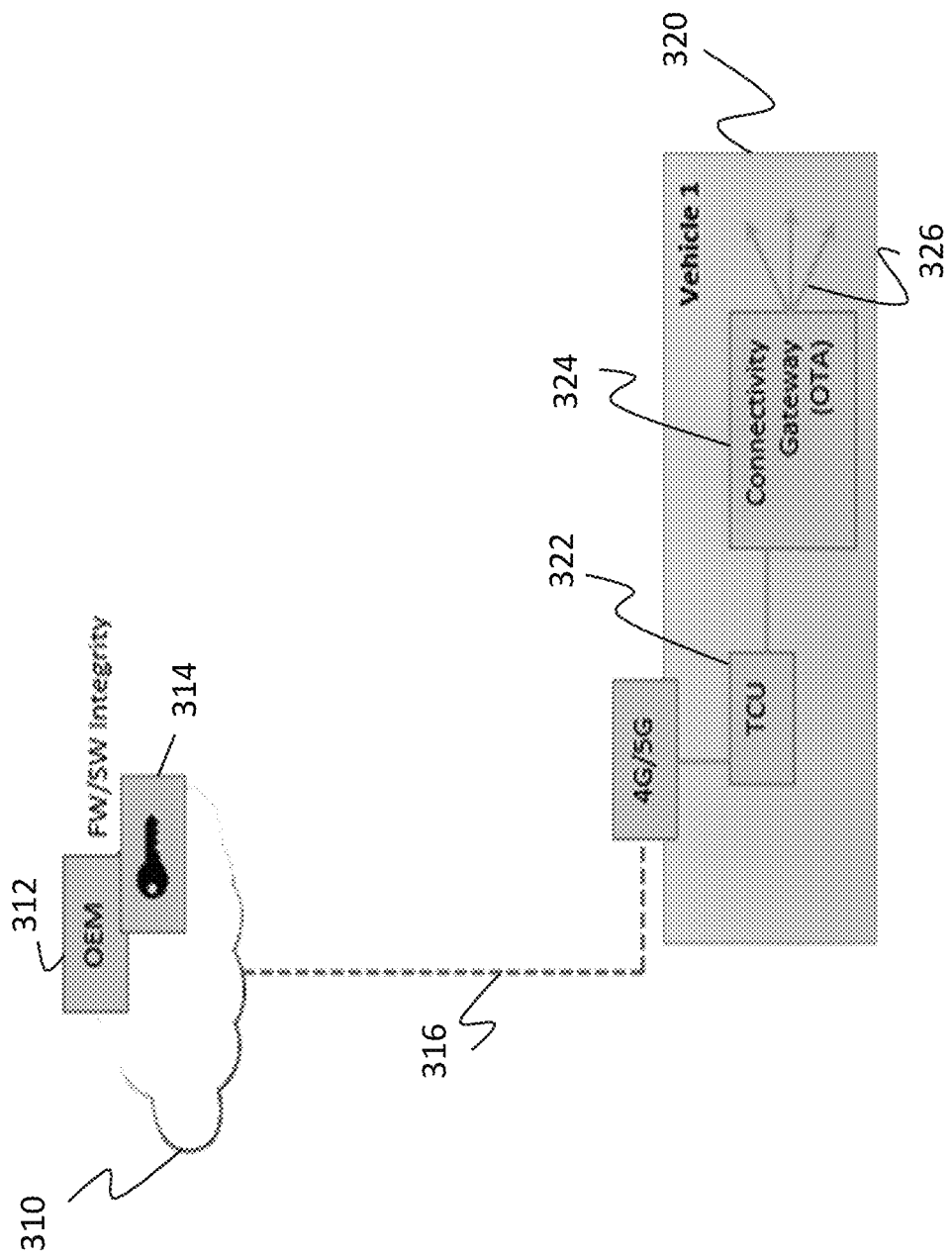
FIG. 3 shows an exemplary system for applying FW/SW according to one embodiment of the disclosure.

FIG. 3 shows an exemplary system for applying FW/SW according to one embodiment of the disclosure. In FIG. 3, cloud 310 may include OEM servers 312 that test package integrity, encrypt and optionally sign (314) FW/SW update package. The FW/SW package may be communicated OTA (316) to vehicle 320. Vehicle 320 is exemplary and marked as Vehicle 1 to denote that the operation may be applied to multiple vehicles in a sample simultaneously. In the exemplary embodiment of FIG. 3, OTA communication is shown with 4G/5G communication standard requiring the transmitter and the receiver to be equipped with appropriate communication platforms. Other communication modes may be used equally without departing from the disclosed principles.

Vehicle 320 includes a transmission control unit (TCU) 322 which controls modern electronic automatic transmissions to the vehicle. TCU 322 receives OTA 316 and directs the FW/SW package to connectivity GW 324 receives the update package and distributes it to the appropriate ECU node in the vehicle as shown by arrows 326. While not shown a similar schematic may be used to provide feedback to cloud 310. Connectivity GW 414 may include various hardware, software and processing logic for secure off-board communication, secure on-board communication, firewall, OTA download manager, as well as secure booting, storage and cryptographic services. As schematically indicated (430), connectivity GW may centrally manage the incoming updates.

Figure 4:
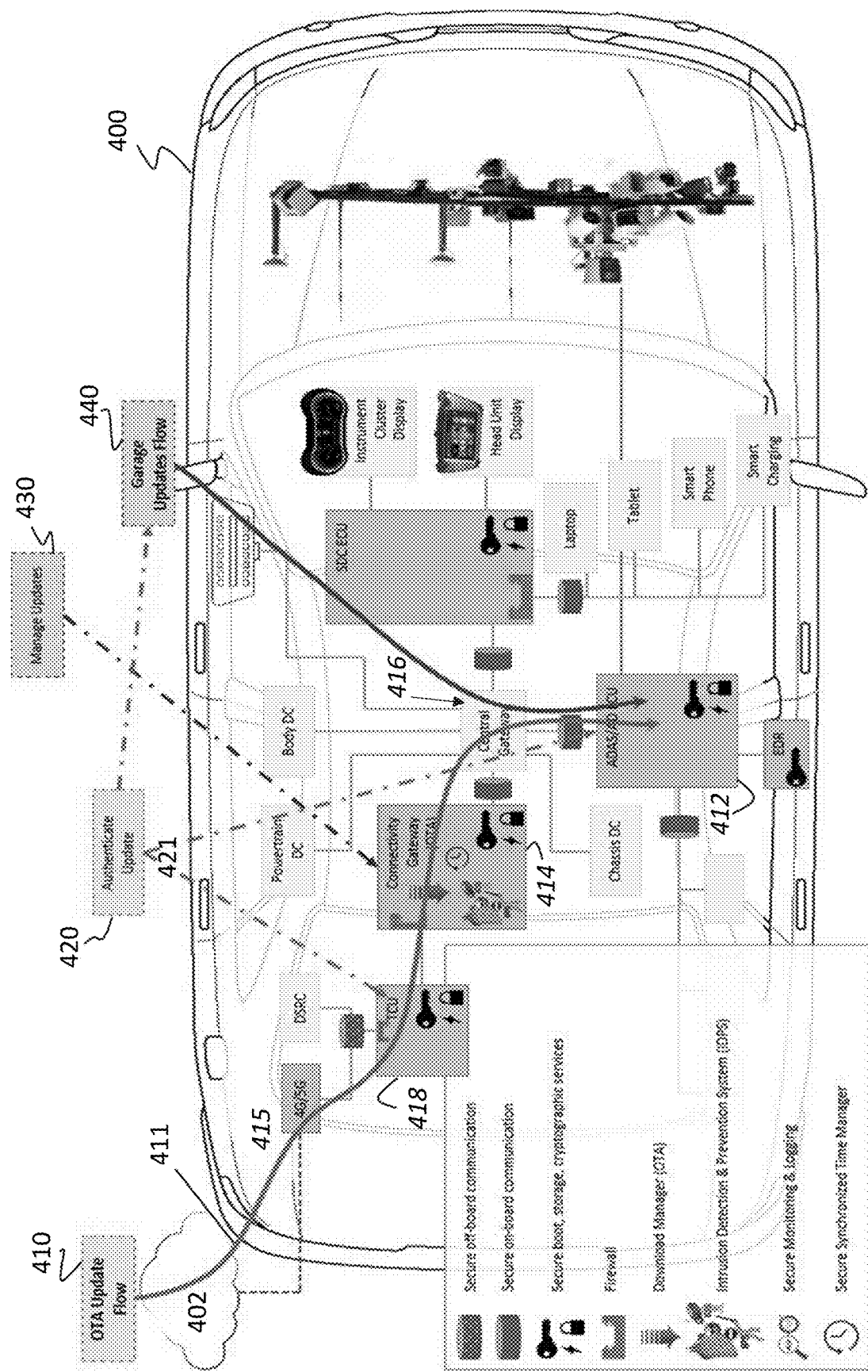
FIG. 4 is an exploded illustration of a vehicle receiving FW/SW according to one embodiment of the disclosure.

FIG. 4 is an exploded illustration of a vehicle receiving FW/SW according to one embodiment of the disclosure. In FIG. 4, vehicle 400 receives FW/SW updates from cloud 402. These may be transmitted OTA as OTA update flow 410. The OTA flow 410 is represented by Arrow 411. By way of example, the OTA updates are routed through TCU 418 and connectivity GW 414 to Advanced Driver Assistance Systems (ADAS) TCU 412. More specifically, the OTA update flow may be communicated by 4G/5G modes to in-vehicle receiving communication platform 415, to appropriate database (optionally) and onto TCU 418.

TCU 418 may then authenticate the OTA updates 420 as shown by dashed arrows 421. Such authentication may occur at connectivity GW 414 and/or ADAS/AD TCU 412. After optinal authentication at connectivity GW 414, the OTA update follow may be routed to central GW 416. Central GW 416 may determine one or more appropriate ECUs/TCUs affected by the OTA update flow. The update flow may then be directed accordingly.

As noted in FIG. 4, various secure on-board communication modules and secure off-board communication modules are placed throughout the vehicles' internal communication module for security. Further, each ECU/TCU may further comprise its one firewall security measures, download manager, secure boot, storage and cryptographic services as well as intrusion detection, secure monitoring and logging as well as secure synchronized time manager.

Referring once again to OTA flow 410, ADAS/AD TCU 412 may then authenticate the received flow updates, decrypt and apply the changes in accordance with the exemplary methods disclosed herein (e.g., straddling versions, etc.) Authentication is shown schematically at 420. Authentication may affect one or more of TCUs, GW or ECUs. The authentication may also occur when the vehicle is stationed at a charging station as indicated by garage updates flow 440.

One or more portions of FIG. 4 may be configured with hardware, software and logic to perform the FW/SW OTA update flow according to the disclosed principles. For example, connectivity GW 414 may be configured with logic to implement one or more steps shown in the flow diagram of FIG. 2. In certain embodiments, connectivity GW 414 may use various applications to detect unauthorized vehicle code modification.

Figure 5:
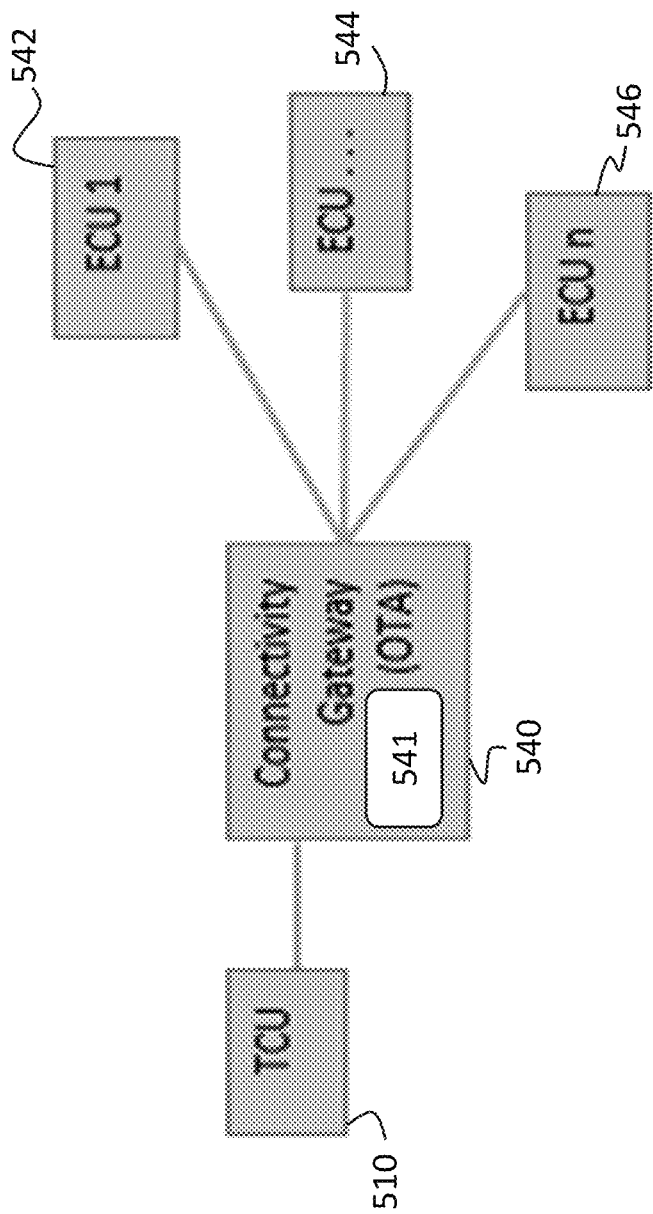
FIG. 5 illustrates an exemplary connectivity GW according to one embodiment of the disclosure.

FIG. 5 illustrates an exemplary connectivity GW according to one embodiment of the disclosure. In FIG. 5, connectivity GW 540 is interposed between TCU 510 and a number of ECUs 542, 544 and 546. Connectivity GW 540 may use attestation mechanism to detect unauthorized modifications to the vehicle's ECUs. If it detects that FW/SW of an ECU was downgraded or modified it can notify OEM cloud and request forced update to the latest (most recent) production version as described below. In certain embodiments, connectivity GW 540 may comprise hardware (e.g., processors) and logic to form an update verification engine (not shown). The update verification engine may search and identify such unauthorized modifications. In certain exemplary embodiments, connectivity GW 540 may comprise an orchestrator engine 541 (comprising hardware, software and logic) to implement disclosed principles as further described below.

As the ECUs (e.g., FIG. 4) in the vehicle boot, they will create and communicate FW/SW hashes and certificates to the Connectivity gateway. Depending on capabilities of individual ECUs, for example whether an ECU has HW-protected execution environment, secure boot capabilities, etc., connectivity GW 540 may additionally query ECUs 542, 544 and 546 for some properties, configuration metadata, or binary hashes. The vehicle infrastructure may apply received update package(s) to the individual ECUs 542, 544 and 546 as appropriate. In certain embodiments, the updates are made to a vehicle while operating or to a vehicle that may be moving very fast on the highway.

The FW/SW package can now be transmitted to the individual ECU or to several ECUs if they require simultaneous update in the case where their functionality depends on each other. It can be assumed that ECUs 5402, 544 and 546 have storage capacity to keep new update package(s).

Each ECU may use virtualization if HW supports it to isolate processing and application of the update while the vehicle is operating.

In certain embodiments, it is contemplated that the new update will not interrupt operation of the vehicle; rather, its intention is to verify that the update does not have defects. It will do so by running in parallel to the existing tested and proven FW/SW. If the ECU does not have HW capability to store and run FW/SW in parallel, connectivity GW 540 may create a simulated virtual environment to emulate the destination ECU and thereby test the updates.

The new FW/SW may be running behind a so-called feature flag, which means that it will be executed but it will not control the vehicle and it will not be used to communicate information to the vehicle displays. Connectivity GW 540 may periodically query and compare information from the production FW/SW and the new updated FW/SW to check for correctness. After a period of time (as may be required by policy) and traveled miles, orchestrator engine 541 in the connectivity GW 540 may initiate removal of the feature flag and replacement of the FW/SW with the new version. At this point, the new FW/SW may be committed and become the production version, it will control the vehicle and communicate information internally (to the displays) and externally.

Once a feature flag has been removed, a vehicle may communicate back to the cloud (e.g., could 310, FIG. 3) that the new FW/SW is running successfully. The cloud, in return, may initiate straddled update of other vehicles. The other vehicles may include vehicles in the geo sample group, another subset of vehicles or all other vehicle at large.

Figure 6:
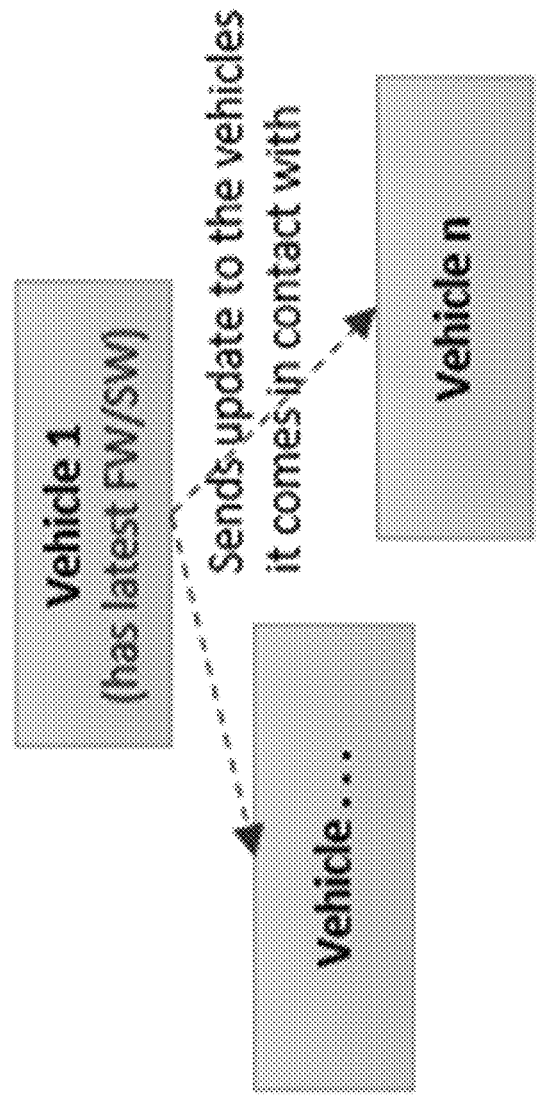
FIG. 6 schematically illustrates how vehicle 1 with the latest working version of the FW/SW may initiate transmission to other vehicles.

FIG. 6 schematically illustrates how vehicle 1 with the latest working version of the FW/SW may initiate transmission to other vehicles. Specifically, FIG. 6 shows a vehicle-to-vehicle (V2V) update format. Here, vehicle 1 may include the latest FW/SW update. The updates are communicated from vehicle 1 to secondary vehicles (vehicle 2, 3 . . . n). In an exemplary embodiment, the vehicles comprise the latest communication technology (e.g., 5G, LTE) to enhance communication. The secondary vehicles may be in direct communication with the primary vehicle (Vehicle 1). Once the FW/SW update is successfully executed in a secondary vehicle, the secondary vehicle may become a primary vehicle and send updates to the vehicles it comes into contact.

In an exemplary implementation, the cloud indicates that approximately 10% (by way of example and may be configured and managed by policy) of vehicles can receive the latest FW/SW. The update will be passed to vehicles in a given geographic location via any available medium: satellite, cell-towers, and by direct links between the vehicles. Because any of the wireless links may not be reliable, the receiving vehicle may indicate that it is ready to accept updates starting at some position. Once it receives entire blob of update package, it may then turn off the notification. The vehicle may also notify the cloud via the same (or other) distributed channels that it has the update and start its application.

Once the new vehicles confirm after some predefined time (probably days) that everything is working, more vehicles may then receive updates until all vehicles are on the latest FW/SW version.

Figure 7:
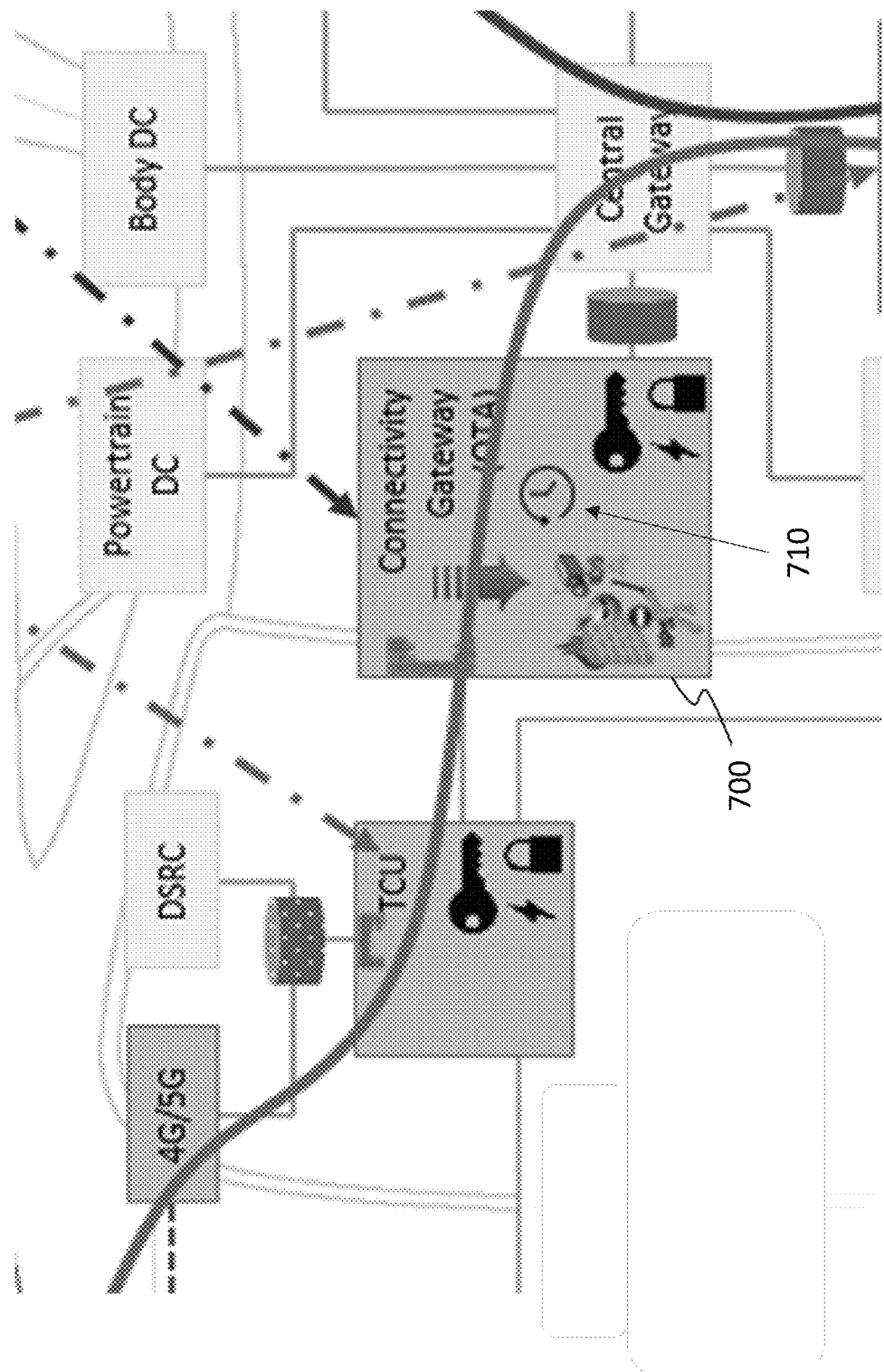
FIG. 7 schematically illustrates a connectivity GW having an updater agent to determine whether existing hardware can support FW/SW updates.

Compatibility—Because the vehicle life can be 10-30 years, some of the new FW/SW may not operate on aged HW. This compatibility problem will be resolved by an updater agent on the vehicle which will decide which features cannot work and whether the old FW/SF has to remain in the vehicle. An updater agent may comprise hardware, software and logic to implement such steps. The updater agent may reside at, for example, the connectivity GW module as illustrated in FIG. 7. In FIG. 7, connectivity GW 700 may include updater agent 710.

Figure 8:
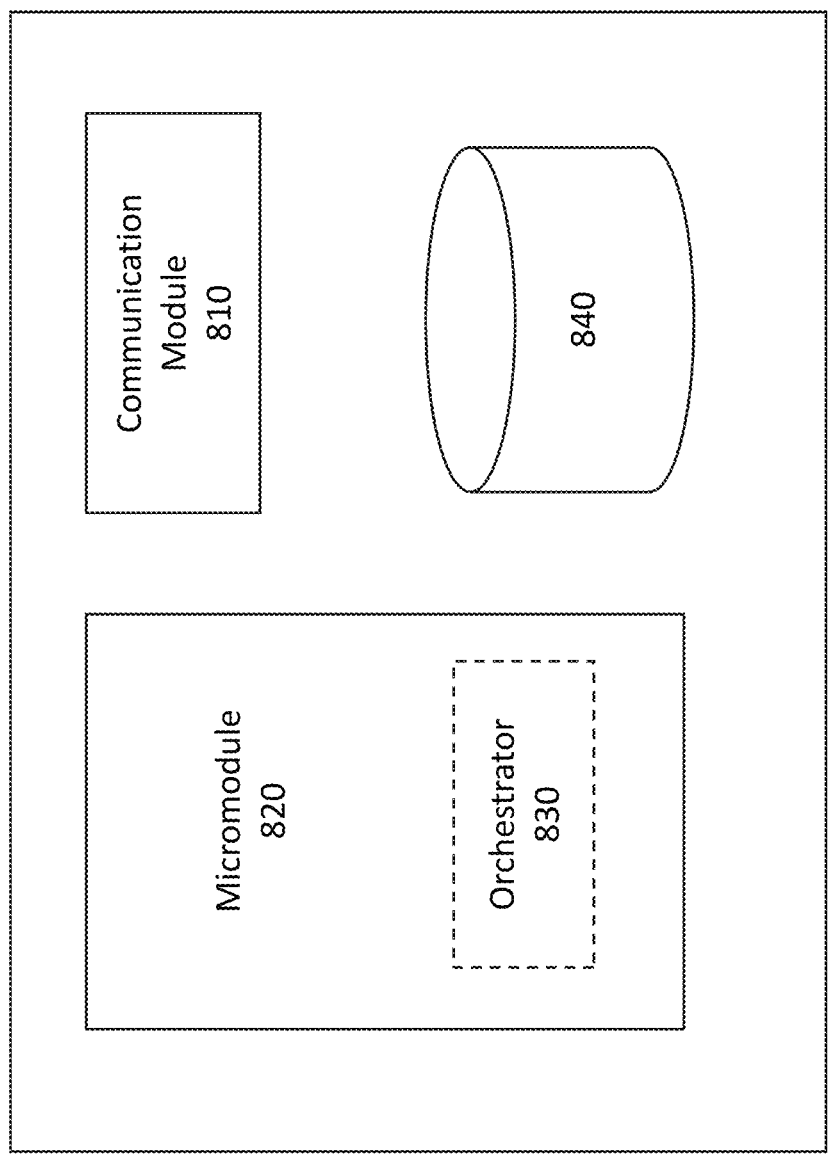
FIG. 8 illustrates an exemplary apparatus according to one embodiment of the disclosure.

FIG. 8 illustrates an exemplary apparatus according to one embodiment of the disclosure. Apparatus 800 of FIG. 8, may comprise hardware, software, logic or a combination of hardware and software with logic programmed to implement the disclosed principles, for example, the steps of flow diagram of FIG. 2. Apparatus 800 may also define one or more of a connectivity GW, orchestrator engine and/or updater agent. In one embodiment, apparatus 800 may comprise an AI CPU. In one exemplary embodiment, CPU 800 may be implemented at an AD vehicle. At another exemplary embodiment, CPU 800 may define an Edge node executed external to the vehicle.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Apparatus 800 comprises communication module 810. The communication module may comprise hardware, software and logic configured for landline, wireless and optical communication. For example, communication module 810 may comprise components to conduct wireless communication, including WiFi, 5G, NFC, Bluetooth, Bluetooth Low Energy (BLE) and the like. Micromodule 820 may comprise processing circuitry required to implement one or more steps illustrates in FIG. 2. Micromodule 820 may include one or more processor circuitries and memory circuities. In the embodiment of FIG. 8, Orchestrator 830 is illustrated as part of Micromodule 820. It should be noted that the representation of FIG. 8 is exemplary and non-limiting. In one embodiment (not shown), Orchestrator 830 may be configured separately from Micromodule 820. Micromodule 820 and Orchestrator 830 may communicate with memory 840. Memory 840 may store one or more tables indicating performance and latency of CPU 800 and other CPUs in communication therewith.

In certain embodiments, Micromodule 820 defines a set of register spaces that record the amount of resources (FLOPS) and response time (latency) for CPU 800. In certain embodiments, Micromodules of different ML CPUs are in constant communication with each other and update each other with real time data on available performance and latency. The synchronization may be implemented based on the application level protocol, such as, message bus to ensure that Micromodules are always in sync or in communication with each other.

In certain embodiments, Orchestrator 830 conducts service discovery (in connection with communication module 810) to find out how many compute nodes (e.g., other vehicles or Edge nodes) are available for use. Once the candidate compute nodes are identified, performance and latency values for each compute node is gathered and stored at database 840. In certain embodiments, Orchestrator 830 me implement the functions disclosed herein with respect to the Orchestrator or the updater agent.

Figure 9:
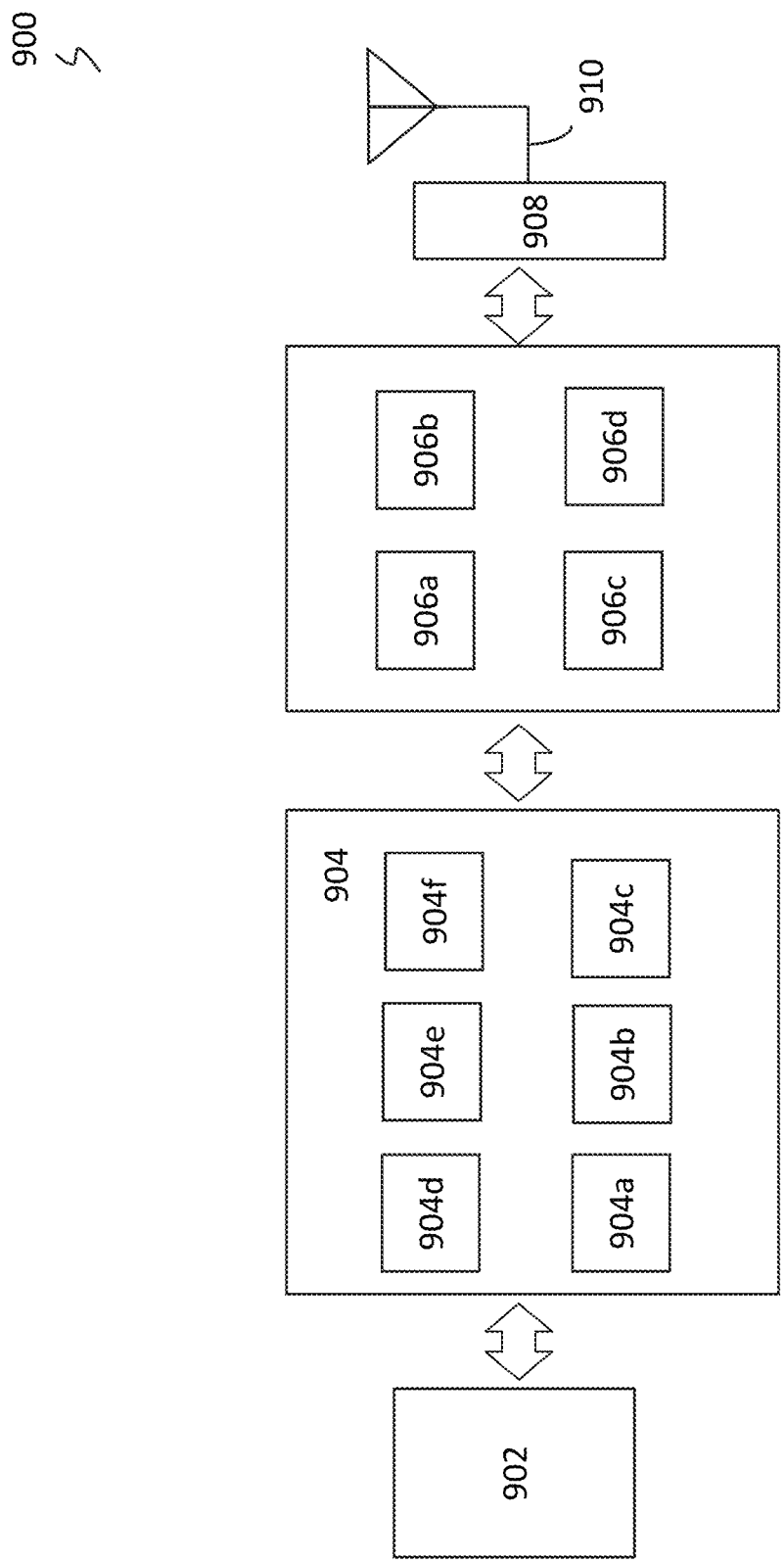
FIG. 9 is a schematic block diagram illustration of components of a communication component in accordance with one or more exemplary embodiments disclosed herein.

FIG. 9 is a schematic block diagram illustration of components of a communication component in accordance with one or more exemplary embodiments disclosed herein. Specifically, FIG. 9 may represent a component of a wireless device as used in CPU 800 of FIG. 8. Communication component 900 may be used for landline or wireless communication in a vehicle. Component 900 may include application circuitry 902, baseband circuitry 904, Radio Frequency (RF) circuitry 906, front-end module (FEM) circuitry 908 and one or more antennas 910, coupled together at least as shown.

Application circuitry 902 may include one or more application processors. For example, application circuitry 902 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 904 may include circuitry such as, but not limited to, one or more single-core or multi-core processors. Baseband circuitry 904 may include one or more baseband processors and/or control logic to process baseband signals received from a receive signal path of RF circuitry 906 and to generate baseband signals for a transmit signal path of the RF circuitry 906. Baseband processing circuity 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or one or more other baseband processors 904d for other existing generations, generations in development or to be developed in the future, for example fifth generation (5G), sixth generation (6G), and so on. Baseband circuitry 904, for example one or more of baseband processors 904a through 904d, may handle various radio control functions that enable communication with one or more radio networks via RF circuitry 906. The radio control functions may include, but are not limited to, signal modulation and/or demodulation, encoding and/or decoding, radio frequency shifting, and so on. In some embodiments, modulation and/or demodulation circuitry of baseband circuitry 904 may include Fast-Fourier Transform (FFT), precoding, and/or constellation mapping and/or demapping functionality. In some embodiments, encoding and/or decoding circuitry of baseband circuitry 904 may include convolution, tail-biting convolution, turbo, Viterbi, and/or LowDensity Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or Radio Resource Control (RRC) elements. Processor 904e of the baseband circuitry 704 may be configured to run elements of the protocol stack for signaling of the PHY, MAC, RLC, PDCP and/or RRC layers. In some embodiments, the baseband circuitry may include one or more audio digital signal processors (DSP) 904f. The one or more audio DSPs 904f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 904 and application circuitry 902 may be implemented together such as, for example, on a system on a chip (SOC).

In some embodiments, baseband circuitry 904 may provide for communication compatible with one or more radio technologies. For example, in some embodiments, baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, RF circuitry 906 may include switches, filters, amplifiers, and so on, to facilitate the communication with the wireless network. RF circuitry 906 may include a receive signal path which may include circuitry to down-convert RF signals received from FEM circuitry 908 and provide baseband signals to baseband circuitry 904. RF circuitry 906 may also include a transmit signal path which may include circuitry to up-convert baseband signals provided by the baseband circuitry 904 and provide RF output signals to FEM circuitry 908 for transmission.

In some embodiments, RF circuitry 906 may include a receive signal path and a transmit signal path. The receive signal path of RF circuitry 906 may include mixer circuitry 906a, amplifier circuitry 906b and filter circuitry 906c. The transmit signal path of RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from FEM circuitry 908 based on the synthesized frequency provided by synthesizer circuitry 906d. Amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, mixer circuitry 906a of the transmit signal path may be configured to up-convert input baseband signals based on the synthesized frequency provided by synthesizer circuitry 906d to generate RF output signals for FEM circuitry 908. The baseband signals may be provided by the baseband circuitry 904 and may be filtered by filter circuitry 906c. Filter circuitry 906c may include a low-pass filter (LPF), although the scope of the embodiments is not limited in this respect.

In some embodiments, mixer circuitry 906a of the receive signal path and the mixer circuitry 906a of the transmit signal path may include two or more mixers and may be arranged for quadrature down conversion and/or up conversion respectively. In some embodiments, mixer circuitry 906a of the receive signal path and the mixer circuitry 906a of the transmit signal path may include two or more mixers and may be arranged for image rejection, for example Hartley image rejection. In some embodiments, mixer circuitry 906a of the receive signal path and the mixer circuitry 906a may be arranged for direct down conversion and/or direct up conversion, respectively. In some embodiments, mixer circuitry 906a of the receive signal path and mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 906 may include analog-to-digital converter (ADC) and digital-to-analog converter (DAC) circuitry, and baseband circuitry 904 may include a digital baseband interface to communicate with RF circuitry 906. In some dual-mode embodiments, separate radio integrated circuit (IC) circuitry may be provided for processing signals for one or more spectra, although the scope of the embodiments is not limited in this respect.

In some embodiments, synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

Synthesizer circuitry 906d may be configured to synthesize an output frequency for use by mixer circuitry 906a of RF circuitry 906 based on a frequency input and a divider control input. In some embodiments, synthesizer circuitry 906d may be a fractional N/N+1 synthesizer.

In some embodiments, frequency input may be provided by a voltage controlled oscillator (VCO), although that is not a requirement. Divider control input may be provided by either baseband circuitry 904 or applications processor 902 depending on the desired output frequency. In some embodiments, a divider control input (e.g., N) may be determined from a look-up table based on a channel indicated by applications processor 902.

Synthesizer circuitry 906d of RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by RF circuitry 906 for transmission by one or more of the one or more antennas 910.

In some embodiments, FEM circuitry 908 may include a transmit/receive (TX/RX) switch to switch between transmit mode and receive mode operation. FEM circuitry 908 may include a receive signal path and a transmit signal path. The receive signal path of FEM circuitry 908 may include a low-noise amplifier (LNA) to amplify received RF signals and to provide the amplified received RF signals as an output, for example to RF circuitry 906. The transmit signal path of FEM circuitry 908 may include a power amplifier (PA) to amplify input RF signals, for example provided by RF circuitry 906, and one or more filters to generate RF signals for subsequent transmission, for example by one or more of antennas 910. In some embodiments, UE device 900 may include additional elements such as, for example, memory and/or storage, display, camera, sensor, and/or input/output (I/O) interface, although the scope of the claimed subject matter is not limited in this respect.

Furthermore, some embodiments may be applied in computing devices that include one or more processors (e.g., with one or more processor cores), such as those discussed with reference to disclosed Figs. herein, including for example, small form factor or mobile computing devices, e.g., an IoT device, M2M device, a smartphone, tablet, UMPC (Ultra-Mobile Personal Computer), laptop computer, Ultrabook™ computing device, wearable devices (such as a smart watch, smart glasses, etc.), 2 in 1 systems, etc. However, embodiments discussed herein are not limited to mobile computing devices and may be applied in any type of computing device, such as a work station, a server, a super computer, etc. Also, some embodiments are applied in computing devices that include a cooling fan as well as fanless computing devices.

In some embodiments, an IoT device may be utilized. An IoT device may include various components (such as one or more components discussed with reference to the disclosed figures). Also, one or more embodiments may utilize a computing cloud (or more generally a "cloud"). The computing cloud may include various types of computing devices. These devices may be in digital communication via a cellular communication channel, a computer network, and/or the Internet. Also, one or more of the components discussed herein can be embodied as a System-On-Chip (SOC) device.

Figure 10:
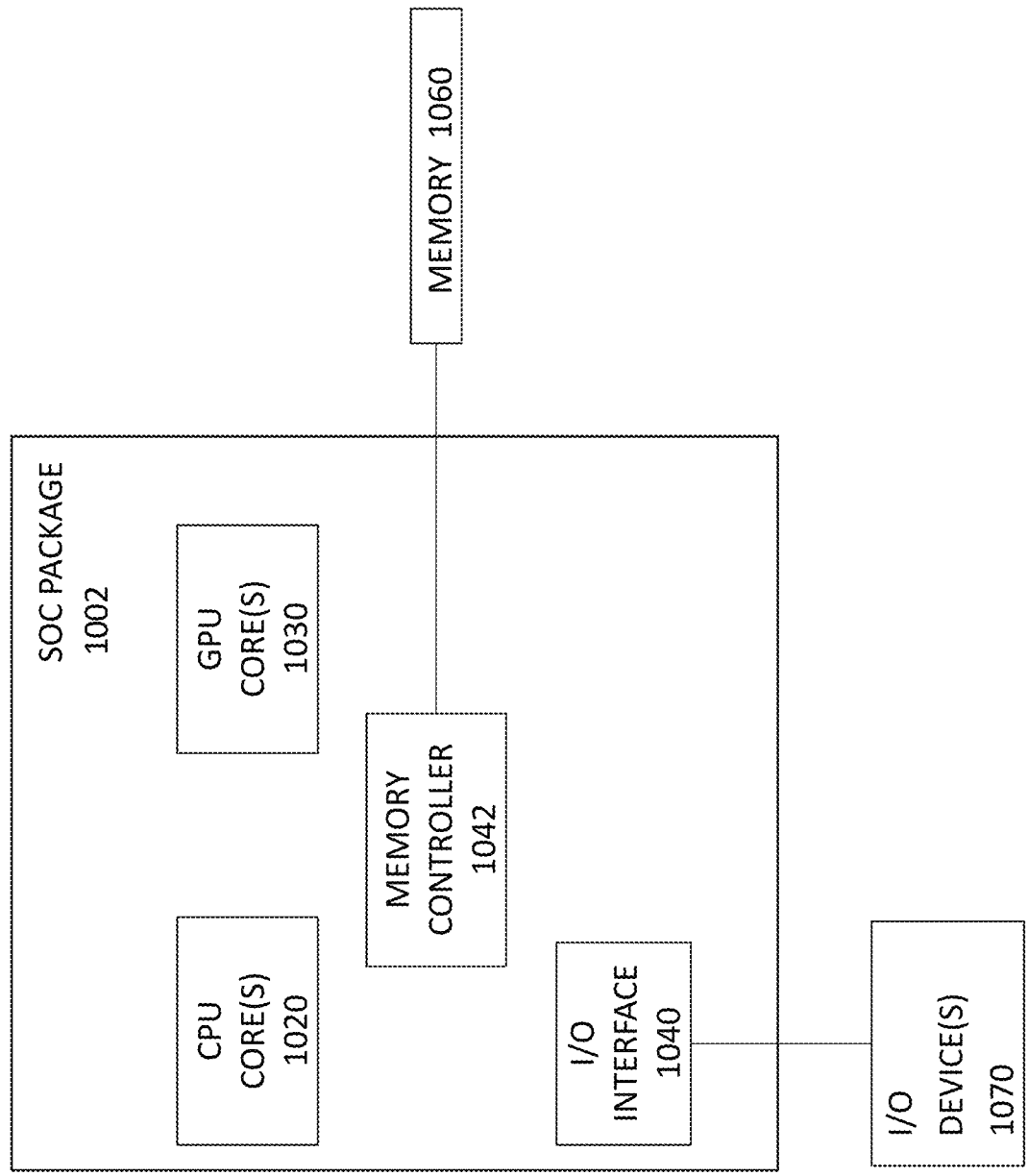
FIG. 10 illustrates a block diagram of an SOC package in accordance with an embodiment.

FIG. 10 illustrates a block diagram of an SOC package in accordance with an embodiment. As illustrated in FIG. 10, SOC 1002 includes one or more Central Processing Unit (CPU) cores 1020, one or more Graphics Processor Unit (GPU) cores 1030, an Input/Output (I/O) interface 1040, and a memory controller 1042. Various components of the SOC package 1002 may be coupled to an interconnect or bus such as discussed herein with reference to the other figures. Also, the SOC package 1002 may include more or less components, such as those discussed herein with reference to the other figures. Further, each component of the SOC package 1020 may include one or more other components, e.g., as discussed with reference to the other figures herein. In one embodiment, SOC package 1002 (and its components) is provided on one or more integrated Circuit (IC) die, e.g., which are packaged into a single semiconductor device.

As illustrated in FIG. 10, SOC package 1002 is coupled to a memory 1060 via the memory controller 1042. In an embodiment, the memory 1060 (or a portion of it) can be integrated on the SOC package 1002.

The I/O interface 1040 may be coupled to one or more I/O devices 1070, e.g., via an interconnect and/or bus such as discussed herein with reference to other figures. I/O device(s) 1070 may include one or more of a keyboard, a mouse, a touchpad, a display, an image/video capture device (such as a camera or camcorder/video recorder), a touch screen, a speaker, or the like.

Figure 11:
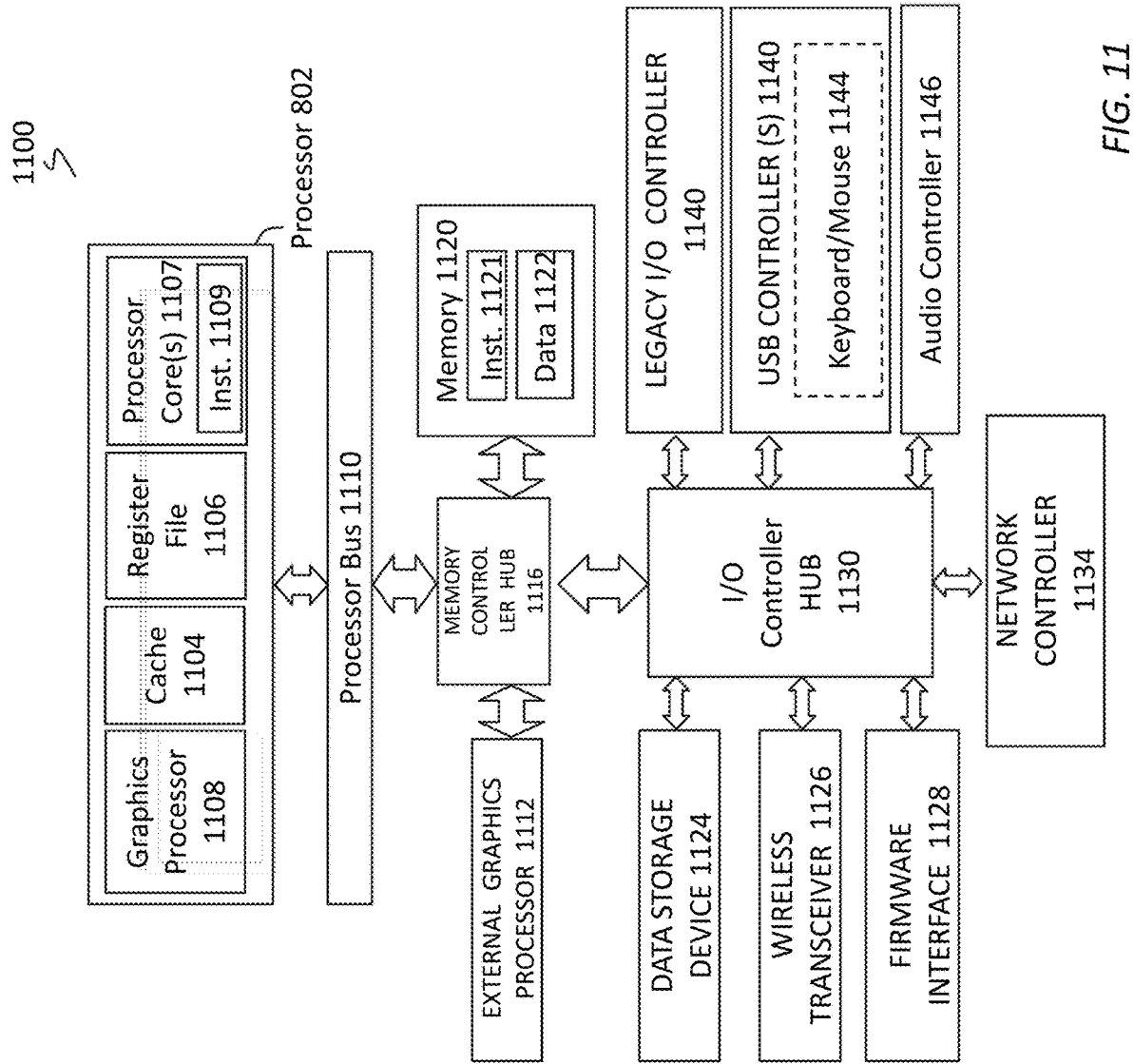
FIG. 11 is a block diagram of a processing system 1100, according to an embodiment.

FIG. 11 is a block diagram of a processing system 1100, according to an embodiment. In various embodiments the system 1100 includes one or more processors 1102 and one or more graphics processors 11011, and may be a single processor desktop system, a multiprocessor workstation system, or a server system having a large number of processors 1102 or processor cores 1107. In one embodiment, the system 1100 is a processing platform incorporated within a system-on-a-chip (SoC or SOC) integrated circuit for use in mobile, handheld, or embedded devices.

An embodiment of system 1100 can include, or be incorporated within a server-based gaming platform, a game console, including a game and media console, a mobile gaming console, a handheld game console, or an online game console. In some embodiments system 1100 is a mobile phone, smart phone, tablet computing device or mobile Internet device. Data processing system 1100 can also include, couple with, or be integrated within a wearable device, such as a smart watch wearable device, smart eyewear device, augmented reality device, or virtual reality device. In some embodiments, data processing system 1100 is a television or set top box device having one or more processors 1102 and a graphical interface generated by one or more graphics processors 11011.

In some embodiments, the one or more processors 1102 each include one or more processor cores 1107 to process instructions which, when executed, perform operations for system and user software. In some embodiments, each of the one or more processor cores 1107 is configured to process a specific instruction set 1109. In some embodiments, instruction set 1109 may facilitate Complex Instruction Set Computing (CISC), Reduced Instruction Set Computing (RISC), or computing via a Very Long Instruction Word (VLIW). Multiple processor cores 1107 may each process a different instruction set 1109, which may include instructions to facilitate the emulation of other instruction sets. Processor core 1107 may also include other processing devices, such a Digital Signal Processor (DSP).

In some embodiments, the processor 1102 includes cache memory 1104. Depending on the architecture, the processor 1102 can have a single internal cache or multiple levels of internal cache. In some embodiments, the cache memory is shared among various components of the processor 1102. In some embodiments, the processor 1102 also uses an external cache (e.g., a Level-3 (L3) cache or Last Level Cache (LLC)) (not shown), which may be shared among processor cores 1107 using known cache coherency techniques. A register file 1106 is additionally included in processor 1102 which may include different types of registers for storing different types of data (e.g., integer registers, floating point registers, status registers, and an instruction pointer register). Some registers may be general-purpose registers, while other registers may be specific to the design of the processor 1102.

In some embodiments, processor 1102 is coupled to a processor bus 1110 to transmit communication signals such as address, data, or control signals between processor 1102 and other components in system 1100. In one embodiment the system 1100 uses an exemplary 'hub' system architecture, including a memory controller hub 1116 and an Input Output (I/O) controller hub 1130. A memory controller hub 1116 facilitates communication between a memory device and other components of system 1100, while an I/O Controller Hub (ICH) 1130 provides connections to I/O devices via a local I/O bus. In one embodiment, the logic of the memory controller hub 1116 is integrated within the processor.

Memory device 1120 can be a dynamic random access memory (DRAM) device, a static random access memory (SRAM) device, flash memory device, phase-change memory device, or some other memory device having suitable performance to serve as process memory. In one embodiment the memory device 1120 can operate as system memory for the system 1100, to store data 1122 and instructions 1121 for use when the one or more processors 1102 executes an application or process. Memory controller hub 1116 also couples with an optional external graphics processor 1112, which may communicate with the one or more graphics processors 11011 in processors 1102 to perform graphics and media operations.

In some embodiments, ICH 1130 enables peripherals to connect to memory device 1120 and processor 1102 via a high-speed I/O bus. The I/O peripherals include, but are not limited to, an audio controller 1146, a firmware interface 11211, a wireless transceiver 1126 (e.g., Wi-Fi, Bluetooth), a data storage device 1124 (e.g., hard disk drive, flash memory, etc.), and a legacy I/O controller 1140 for coupling legacy (e.g., Personal System 2 (PS/2)) devices to the system. One or more Universal Serial Bus (USB) controllers 1142 connect input devices, such as keyboard and mouse 1144 combinations. A network controller 1134 may also couple to ICH 1130. In some embodiments, a high-performance network controller (not shown) couples to processor bus 1110. It will be appreciated that the system 1100 shown is exemplary and not limiting, as other types of data processing systems that are differently configured may also be used. For example, the I/O controller hub 1130 may be integrated within the one or more processor 1102, or the memory controller hub 1116 and I/O controller hub 1130 may be integrated into a discreet external graphics processor, such as the external graphics processor 1112.

Additional Notes & Examples

The following exemplary and non-limiting embodiments are provided to further illustrated the disclosed principles. Example 1 is directed to a system to dynamically upgrade code in a vehicle, the apparatus comprising: a communication module for one or more of wireless or landline communication; a central processing unit (CPU) in communication with the communication module, the CPU configured to receive an indication requiring a code upgrade to an existing vehicle code software and receive the code upgrade; store the code upgrade; execute code upgrade in parallel with the existing vehicle code software; log one or more error indications resulted from execution of the code upgrade; replace the existing vehicle code with the code upgrade if the logged error indication is less than a first threshold; and direct the code upgrade to a second vehicle to update the second vehicle code.

Example 2 is directed to the system of example 1, wherein the CPU is configured to receive the indication requiring a code upgrade from an Edge node.

Example 3 is directed to the system of example 1, wherein the communication module is configured to communicate in at least one of 5G, 4G, LTE and WiFi communication modes.

Example 4 is directed to the system of example 1, wherein the CPU is configured to store the code upgrade as feature flag.

Example 5 is directed to the system of example 1, wherein the CPU is configured to execute code upgrade in parallel with the existing vehicle code software and wherein the CPU stores the code upgrade in read-only mode.

Example 6 is directed to the system of example 1, wherein the code upgrade consists essentially of bits that are changed with respect to the existing vehicle code software.

Example 7 is directed to the system of example 1, wherein the CPU is configured to transmit the code upgrade directly to a second vehicle while the vehicle and the second vehicle are in operation.

Example 8 is directed to the system of example 1, wherein the CPU is configured to authenticate the received code upgrade prior to storing the code upgrade.

Example 9 is directed to the system of example 1, wherein the CPU is configured to decrypt the received code upgrade prior to storing the code upgrade.

Example 10 is directed to a least one machine-readable medium including instructions to dynamically upgrade code in a vehicle, which when executed, causes one or more processors to: receive an indication requiring a code upgrade to an existing vehicle code software and receive the code upgrade; store the code upgrade; execute code upgrade in parallel with the existing vehicle code software; log one or more error indications resulted from execution of the code upgrade; replace the existing vehicle code with the code upgrade if the logged error indication is less than a first threshold; and direct the code upgrade to a second vehicle in a vehicle-to-vehicle communication to update the second vehicle code.

Example 11 is directed to the medium of example 10, wherein the instructions further cause the one or more processors to-receive the indication requiring a code upgrade from an Edge node.

Example 12 is directed to the medium of example 10, wherein the instructions further cause the one or more processors-to receive the indication in at least one of 5G, 4G, LTE and WiFi communication modes.

Example 13 is directed to the medium of example 10, wherein the instructions further cause the one or more processors to-store the code upgrade as feature flag.

Example 14 is directed to the medium of example 10, wherein the instructions further cause the one or more processors to-execute code upgrade in read-only mode and in parallel with the existing vehicle code software.

Example 15 is directed to the medium of example 10, wherein the code upgrade consists essentially of bits that are changed with respect to the existing vehicle code software.

Example 16 is directed to the medium of example 10, wherein the instructions further cause the one or more processors to-transmit vehicle-to-vehicle communication while the vehicles are operation.

Example 17 is directed to the medium of example 10, wherein the instructions further cause the one or more processors to-authenticate the received code upgrade prior to storing the code upgrade.

Example 18 is directed to the medium of example 10, wherein the instructions further cause the one or more processors to-decrypt the received code upgrade prior to storing the code upgrade.

Example 19 is directed to an apparatus to dynamically upgrade code in a vehicle, the apparatus comprising: a central processing unit (CPU) in communication with the communication module, the CPU configured with logic to: receive an indication requiring a code upgrade to an existing vehicle code software and receive the code upgrade; store the code upgrade; execute code upgrade in parallel with the existing vehicle code software; log one or more error indications resulted from execution of the code upgrade; replace the existing vehicle code with the code upgrade if the logged error indication is less than a first threshold; and direct the code upgrade to a second vehicle to update the second vehicle code.

Example 20 is directed to the apparatus of example 19, wherein the CPU logic is configured to receive the indication requiring a code upgrade from an Edge node.

Example 21 is directed to the apparatus of example 19, wherein the communication module is configured to communicate in at least one of 5G, 4G, LTE and WiFi communication modes.

Example 22 is directed to the apparatus of example 19, wherein the CPU logic is configured to store the code upgrade as feature flag.

Example 23 is directed to the apparatus of example 19, wherein the CPU logic is configured to execute code upgrade in parallel with the existing vehicle code software and wherein the CPU stores the code upgrade in read-only mode.

Example 24 is directed to the apparatus of example 19, wherein the code upgrade consists essentially of bits that are changed with respect to the existing vehicle code software.

Example 25 is directed to the apparatus of example 19, wherein the CPU logic is configured to transmit the code upgrade directly to a second vehicle while the vehicle and the second vehicle are in operation.

Example 26 is directed to the apparatus of example 19, wherein the CPU logic is configured to authenticate the received code upgrade prior to storing the code upgrade.

Example 27 is directed to the apparatus of example 19, wherein the CPU logic is configured to decrypt the received code upgrade prior to storing the code upgrade.

Example 28 relates to an apparatus comprising means to perform a method as described in any preceding example.

Example 29 relates to a machine-readable storage including machine-readable instructions, when executed, to implement a method or realize an apparatus as claimed in any preceding claim.

Example 30 relates to a method to dynamically upgrade code in a vehicle, the method comprising: receiving an indication requiring a code upgrade to an existing vehicle code software and receive the code upgrade storing the code upgrade; executing code upgrade in parallel with the existing vehicle code software; logging one or more error indications resulted from execution of the code upgrade; replacing the existing vehicle code with the code upgrade if the logged error indication is less than a first threshold; and directing the code upgrade to a second vehicle in a vehicle-to-vehicle communication to update the second vehicle code.

Example 31 relates to a device to dynamically upgrade code in a vehicle, comprising means for receiving an indication requiring a code upgrade to an existing vehicle code software and means for receiving the code upgrade; means for storing the code upgrade; means for executing code upgrade in parallel with the existing vehicle code software; means for logging one or more error indications resulting from execution of the code upgrade; means for replacing the existing vehicle code with the code upgrade if the logged error indication is less than a first threshold; and means for directing the code upgrade to a second vehicle in a vehicle-to-vehicle communication to update the second vehicle code.

While the principles of the disclosure have been illustrated in relation to the exemplary embodiments shown herein, the principles of the disclosure are not limited thereto and include any modification, variation or permutation thereof.

What is claimed is:

1. A system to dynamically upgrade code in a vehicle, the system comprising:
 a communication module for one or more of wireless or landline communication;
 a central processing unit (CPU) in communication with the communication module, the CPU configured to
 execute instructions to receive a code upgrade to an existing vehicle code software;
 store the code upgrade;
 execute code upgrade in parallel with the existing vehicle code software at the CPU;
 log one or more error indications resulted from execution of the code upgrade;
 compare the logged error indications with a first threshold;
 in response to the logged error being less than a first threshold, replace the existing vehicle code with the code upgrade; and
 direct the code upgrade to a second vehicle to update the second vehicle code;
 wherein the code upgrade is executed in parallel with the existing vehicle code substantially simultaneously on the CPU; and
 wherein the instructions further provide background updates and support forward- and backward-compatibility.

2. The system of claim 1, wherein the CPU is configured to receive the indication requiring a code upgrade from an Edge node.

3. The system of claim 1, wherein the communication module is configured to communicate in at least one of 5G, 4G, LTE and WiFi communication modes.

4. The system of claim 1, wherein the CPU is configured to store the code upgrade as feature flag.

5. The system of claim 1, wherein the CPU is configured to execute code upgrade in parallel with the existing vehicle code software and wherein the CPU stores the code upgrade in read-only mode.

6. The system of claim 1, wherein the code upgrade consists essentially of bits that are changed with respect to the existing vehicle code software.

7. The system of claim 1, wherein the CPU is configured to transmit the code upgrade directly to a second vehicle while the vehicle and the second vehicle are in operation.

8. The system of claim 1, wherein the CPU is configured to authenticate the received code upgrade prior to storing the code upgrade.

9. The system of claim 1, wherein the CPU is configured to decrypt the received code upgrade prior to storing the code upgrade.

10. The system of claim 1, further comprising replace the existing vehicle code with the code upgrade if the logged error indication is less than the first threshold.

11. At least one machine-readable, non-transitory, medium including instructions to dynamically upgrade code in a vehicle, which when executed, causes one or more processors to:
 execute instructions to receive a code upgrade to an existing vehicle code software;
 store the code upgrade;
 execute code upgrade in parallel with the existing vehicle code software at the Central Processing Unit (CPU);
 log one or more error indications resulted from execution of the code upgrade;
 compare the logged error indication with a first threshold;
 in response to the logged error being less than a first threshold, replace the existing vehicle code with the code upgrade; and
 direct the code upgrade to a second vehicle in a vehicle-to-vehicle communication to update the second vehicle code;
 wherein the code upgrade is executed in parallel with the existing vehicle code substantially simultaneously on the CPU; and
 wherein the instructions further provide background updates and support forward- and backward-compatibility.

12. The medium of claim 11, wherein the instructions further cause the one or more processors to-receive the indication requiring a code upgrade from an Edge node.

13. The medium of claim 11, wherein the instructions further cause the one or more processors-to receive the indication in at least one of 5G, 4G, LTE and WiFi communication modes.

14. The medium of claim 11, wherein the instructions further cause the one or more processors to-store the code upgrade as feature flag.

15. The medium of claim 11, wherein the instructions further cause the one or more processors to-execute code upgrade in read-only mode and in parallel with the existing vehicle code software.

16. The medium of claim 11, wherein the code upgrade consists essentially of bits that are changed with respect to the existing vehicle code software.

17. The medium of claim 11, wherein the instructions further cause the one or more processors to-transmit vehicle-to-vehicle communication while the vehicles are operation.

18. The medium of claim 11, wherein the instructions further cause the one or more processors to-authenticate the received code upgrade prior to storing the code upgrade.

19. The medium of claim 11, wherein the instructions further cause the one or more processors to-decrypt the received code upgrade prior to storing the code upgrade.

20. An apparatus to dynamically upgrade code in a vehicle, the apparatus comprising:
 a central processing unit (CPU) in communication with the communication module, the CPU configured with logic to:
 execute instructions to receive a code upgrade to an existing vehicle code software;
 store the code upgrade;
 execute code upgrade in parallel with the existing vehicle code software at the CPU;

log one or more error indications resulted from execution of the code upgrade;

compare the logged error indications with a first threshold;

in response to the logged error being less than a first threshold, replace the existing vehicle code with the code upgrade if the logged error indication is less than a first threshold; and direct the code upgrade to a second vehicle to update the second vehicle code;

wherein the code upgrade is executed in parallel with the existing vehicle code substantially simultaneously on the same CPU; and wherein the instructions further provide background updates and support forward- and backward-compatibility.

21. The apparatus of claim 20, wherein the CPU logic is configured to receive the indication requiring a code upgrade from an Edge node.

22. The apparatus of claim 20, wherein the communication module is configured to communicate in at least one of 5G, 4G, LTE and WiFi communication modes.

23. The apparatus of claim 20, wherein the CPU logic is configured to store the code upgrade as feature flag.

24. The apparatus of claim 20, wherein the CPU logic is configured to execute code upgrade in parallel with the existing vehicle code software and wherein the CPU stores the code upgrade in read-only mode.

25. The apparatus of claim 20, wherein the code upgrade consists essentially of bits that are changed with respect to the existing vehicle code software.

26. The apparatus of claim 20, wherein the CPU logic is configured to transmit the code upgrade directly to a second vehicle while the vehicle and the second vehicle are in operation.

27. The apparatus of claim 20, wherein the CPU logic is configured to authenticate the received code upgrade prior to storing the code upgrade.

28. The apparatus of claim 20, wherein the CPU logic is configured to decrypt the received code upgrade prior to storing the code upgrade.

* * * * *